Patented June 24, 1930

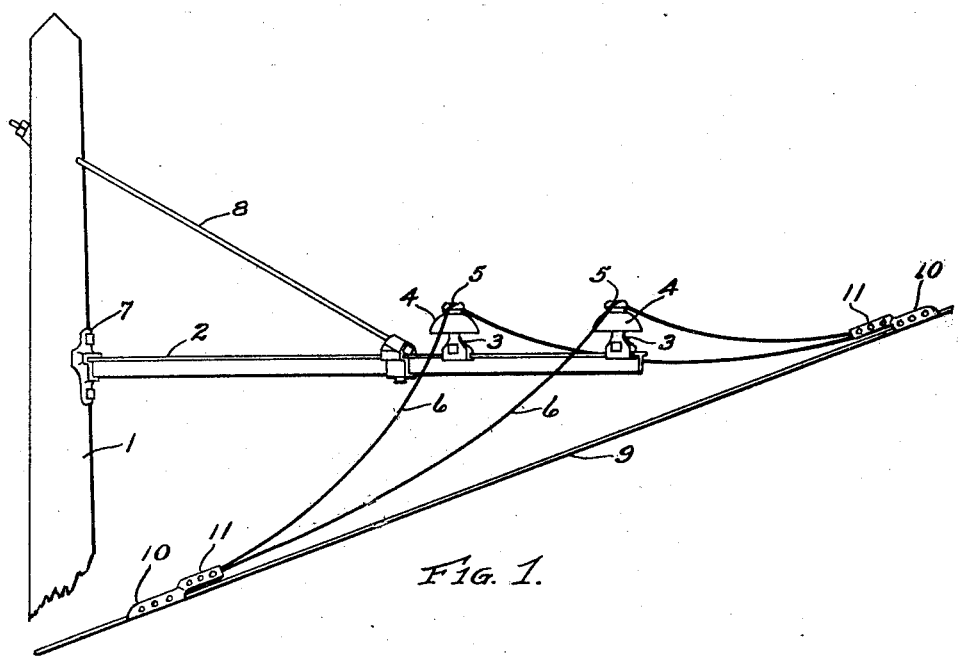
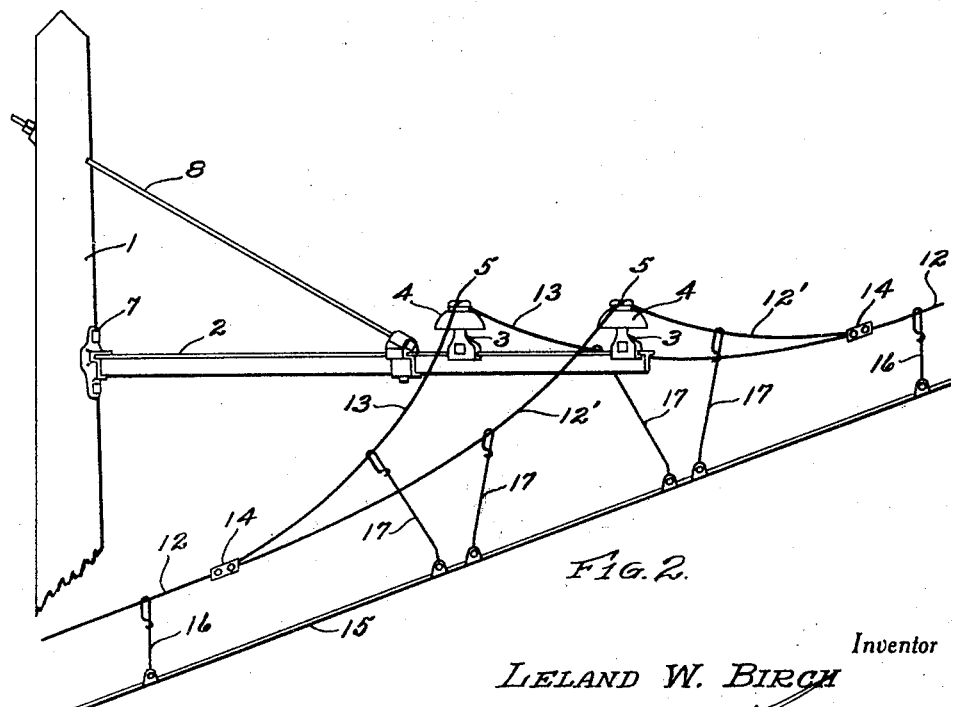

1,766,874

UNITED STATES PATENT OFFICE

LELAND W. BIRCH, OF MANSFIELD, OHIO, ASSIGNOR TO THE OHIO BRASS COMPANY, OF MANSFIELD, OHIO, A CORPORATION OF NEW JERSEY

CONDUCTOR SUPPORT

Application filed July 25, 1929. Serial No. 380,863.

My invention relates to the supporting of conductors and particularly conductors used in electric track systems.

The object of my invention is to provide a system of overhead construction to which the trolley wire or conductor is properly supported at the poles and the lateral swaying of the trolley wire is prevented or reduced to a small amount.

Another object is to provide a system which is flexible and yielding to the passage of the current collector.

My invention resides in the new and novel combination and arrangement of the various parts and elements hereinafter described and shown in the accompanying drawing.

In the drawing:—

Fig. 1 is a perspective view of a contact or trolley wire suspended from a bracket by means of two spaced supports.

Fig. 2 is a perspective view of a contact or trolley wire suspended from a catenary cable which is branched or divided to form two spaced supporting wires at the bracket.

In overhead systems for electric track lines, it is desirable to suspend the contact wire at a predetermined relation above and with respect to the track and to maintain the trolley wire with as little sagging as possible. It is also desirable to prevent the side or lateral swaying of the trolley wire.

With the ordinary system where the contact wire is suspended at poles spaced fifty or seventy-five feet apart, the sag is considerable in the wire and the lateral swaying of the wire is considerable, but where the trolley wire is suspended from a catenary cable, the sag is practically eliminated and the side swaying is also eliminated to a very large degree.

I have devised a method of supporting a trolley wire on both the ordinary and catenary systems such that the side swaying is eliminated or at least reduced to a very small degree and at the same time flexibility or yielding with respect to the passing current collector is not eliminated.

In Fig. 1, which is the simpler of the two systems, I have shown a pole 1 with a horizontal support arm 2 and having mounted thereon adjustable supporting pins 3 and upon which are mounted insulators 4 having top grooves 5 in which rest the supporting cables 6. The bracket 2 is secured to the pole by means of the fitting 7 and the rod 8. The trolley or contact wire 9 has secured to it the clamps 10 spaced from each other a predetermined distance on both sides of the bracket 2. Each clamp is provided with a portion 11 by means of which the supporting wires or cables 6 are secured to the clamps 10 and in turn to the contact wire 9. The supporting cables 6 may be made as long as desired, that is, they may be connected to the trolley wire 9 at as distant points as desired and are spaced apart at their support to the bracket a sufficient distance to prevent lateral swaying of the contact wire to the amount desired. The greater the spacing of the cables 6 at their points of support on the bracket, the greater will be the resistance of the swaying of the contact wire. The contact wire is perfectly free to move as the current collector passes along its length.

In Fig. 2 I have shown a similar arrangement with respect to the pole and bracket, but a continuous catenary cable 12 and 12' is shown with an auxiliary cable 13, which is secured to the catenary cable 12 by means of the clamps 14. The diverging of the cables 12' and 13 have the same bracing effect as that construction shown in Fig. 1.

Below the catenary cable and the auxiliary cable is suspended the contact wire 15 by means of hangers 16 which are made of such lengths as to maintain the contact wire 15 in a substantially straight line. The contact wire 15 is supported and braced by the hangers 17 from the cables 12' and 13, and the hangers 17 are preferably of a rod formation so that they will take tension and compression stresses without bending materially.

It will be evident that if the catenary cables 12' and 13 are prevented from swaying and have a tendency to break the swaying of the catenary 12 throughout its length, that then the contact wire 15 will also be braced against side swaying through the medium of the hangers 17. The hangers 16 and 17 are of metallic construction and therefore the catenary cable 12 is a conductor cable as well as the wire 15.

It will be noted that the ordinary system shown in Fig. 1 could be very easily and cheaply turned into the catenary system shown in Fig. 2 by merely suspending underneath the contact wire 9 a new contact wire corresponding to 15 in Fig. 2 and connecting them by means of hangers such as 16 and 17.

I am not showing in detail the construction of the various elements as they are common and well known to those skilled in the art and are not necessarily special for use in my system.

Having described my invention, I claim:—

1. An overhead system comprising an upright support and a support arm, a pair of spaced insulators mounted on the arm, a catenary cable extending over and supported by one of the insulators, an auxiliary cable secured to the first cable at divergent points distant from both sides of the arm and supported on the other insulator, a contact wire suspended below the catenary cable by vertically disposed hangers between the said divergent points positioned between two arms and by obliquely disposed hangers positioned between the divergent points on either side of the arm, the last said hangers biased to prevent side swaying of the contact wire.

2. An overhead system comprising a support, a pair of spaced insulators mounted on the support, a catenary cable supported by an insulator, an auxiliary cable supported by the other insulator and secured to the catenary cable at spaced points on both sides of the support and forming divergent members to reduce side sway of the catenary cable, a contact wire positioned below the catenary cable and hangers securing the wire to the catenary and auxiliary cables.

3. An overhead system comprising a plurality of spaced supports, a contact wire, a plurality of spaced insulators on each support, a single supporting cable having a part extending above the contact wire and in a vertical plane therewith between the supports and having diverging parts adjacent the supports and secured to the insulators and symmetrically disposed relative to the contact wire, spaced supporting means between the single cable and contact wire and obliquely disposed supporting and steadying means between the diverging parts and the adjacent contact wire.

4. An overhead system comprising a plurality of spaced supports, a plurality of spaced insulators on each support, a flexible supporting means extending between and over the supports and having diverging parts adjacent the supports and secured to the insulators, a contact wire below the flexible supporting means and suspended therefrom by hangers, the hangers being substantially vertical along the flexible means below the diverging parts and obliquely disposed in substantially vertical planes from the diverging parts.

5. An overhead system comprising a support, spaced insulators mounted on the support, spaced cables diverging from a meeting point on each side of the support and mounted on the insulators, a contact wire symmetrically disposed below the said diverging cables and diverging supports and steadying members connected to the cables and the contact wire.

In testimony whereof I affix my signature.

LELAND W. BIRCH.